United States Patent
Anderson

[11] 4,088,120
[45] May 9, 1978

[54] SOLAR CONCENTRATOR-COLLECTOR

[75] Inventor: Donald E. Anderson, Northfield, Minn.

[73] Assignee: Suntec Systems, Inc., Lakeville, Minn.

[21] Appl. No.: 719,732

[22] Filed: Sep. 2, 1976

[51] Int. Cl.$^2$ .................................................. F24J 3/02
[52] U.S. Cl. .................................... 126/271; 126/270; 237/1 A
[58] Field of Search ............... 126/270, 271; 237/1 A; 60/641

[56] References Cited

U.S. PATENT DOCUMENTS

| 811,274 | 1/1906 | Carter | 126/271 |
|---|---|---|---|
| 1,661,473 | 3/1928 | Goddard et al. | 126/271 |
| 1,672,750 | 6/1928 | Christiansen | 126/271 |
| 3,884,217 | 5/1975 | Wartes | 126/271 |
| 4,022,184 | 5/1977 | Anderson | 237/1 A |

Primary Examiner—William F. O'Dea
Assistant Examiner—Larry Jones
Attorney, Agent, or Firm—Orrin M. Haugen

[57] ABSTRACT

A solar heat concentrator-collector comprising, in combination, solar radiation concentrator means and collector means for receiving the concentrated solar energy and providing for conversion of the energy into usable or more readily convertable form. The concentrator means may be any of a variety of concentrators known and used in the art, however the collector means of the present invention functions extremely well with a line focus Fresnel array, the array including a plurality of generally parallelly disposed elongated self-supporting elements or panels each with a reflective surface, and with each element or panel having means for positioning its reflective surface in an operative solar viewing disposition. The collector means when adapted for use with a line focus Fresnel array includes an energy absorbing means such as one or more conduits, each having a fluid heat transfer medium moving therethrough, and with an improved shroud enclosing at least a portion of the collector, the shroud comprising a radiation permeable member having an outer surface concave to the concentrator and defining a transmissive path for a substantial portion of the incident radiation. The configuration of the surface of the radiation permeable member provides a re-entrant path for any radiation which is reflected from the surface thereof. The conduit carrying the heat transfer medium has a closed cross-section such as an elongated member of circular or rectangular cross-section to form a cylinder, or other regular structure, and with the axis of the fluid transfer conduit or conduits being generally parallel to the longitudinal axis of the array of reflective surfaces or panels. A substantial portion of the fluid transfer duct is arranged to view the concentrator means at or along a line substantially at or adjacent the focal point of the concentrator. That portion of the peripheral surface of the collector which comprises the concentrator viewing surface is normally a double-plate or double-glazed arrangement of spaced apart parallelly disposed panels providing a thermal transfer barrier, and the remaining portion of the collector is likewise preferably thermally insulated.

17 Claims, 18 Drawing Figures

SOLAR CONCENTRATOR-COLLECTOR

CROSS-REFERENCE TO RELATED APPLICATION

The present invention is an improved collector which may be used in combination with the concentrator disclosed and claimed in my co-pending application Ser. No. 556,650, filed Mar. 10, 1975, entitled "Lateral Lens Arrangement for Solar Energy Conversion Devices" now U.S. Pat. No. 4,022,184, May 10, 1977 and assigned to the same assignee as the present case.

BACKGROUND OF THE INVENTION

The present invention relates generally to an improved solar energy concentrator-collector, and more particularly to a energy collector for use with a solar heat concentrator of the line focus type. The entire system includes, in combination, an array of reflective panels forming a solar radiation concentrator, and a collector or absorber means cooperating with the array for receiving the concentrated solar energy. The collector provides an efficient system for receiving concentrated solar energy, with the collector having a concentrator-viewing window or surface which transmits a substantially increased portion of incident radiation, by providing a re-entrant path for any incident radiation from the concentrator which may otherwise be reflected from the surface of the window. With the continuing utilization and ultimate partial depletion of available fossil fuels, use of alternate sources of energy has become desirable, provided feasible means and techniques can be found for their utilization. In this connection, solar energy may be employed as a high-grade non-polluting source for the generation of usable energy with this source of energy being freely available. Conversion of solar energy into usable energy may typically be achieved by thermodynamic arrangements, such as, for example, by the generation of steam or other heated fluid for ultimate utilization at a power conversion site. One approach which is commonly taken for conversion of solar energy is the utilization of flat absorbers to heat a fluid transfer medium such as water, the heated water then being transferred to either a thermally insulated reservoir or a zone wherein heat may be extracted. Such absorbers are normally referred to as "flat plate collectors". Since collector surface areas must be substantial, the cost of such collectors along with the thermal efficiency at low ambient temperatures renders certain designs disadvantageous. These disadvantages are overcome with the structure and design of the present invention.

In conventional or known solar energy systems, such as flat plate collectors or the like, a number of common problems have existed and the existence of these problems has retarded the growth and acceptance of solar heating systems. Normally, the primary problem is the initial on-site installation cost, with this cost normally being large due to the excessive size of conventional or effective systems. Furthermore, complex manifolding of the individual collectors in the system has presented problems due to leakage. The weight of the installation has also presented problems, particularly the weight of a fully loaded flat plate fluid collection system. When a roof mounted flat plate fluid system is specified, particularly in an existing building structure, the load bearing capability of the structure is frequently insufficient to support the fluid-loaded systems and added structural supports must be provided. A further problem has existed with most flat plate solar heating elements, due to the low velocities normally utilized in the system. With low velocities, fluid corrosion and plugging of transmission lines may be more likely to occur than in systems employing high velocity fluid transfer.

In the present solar heat concentrator-collector system, the design illustrated is one preferably employing a concentrator with generally horizontally disposed cylinders, parabolas or elongated flat plates forming an array of reflector panels. The collector preferably comprises an elongated structure having its axis generally parallel to the axis of the cylindrical elements forming the array, the collector being provided with a concentrator viewing surface which provides a means for collecting that portion of the incident concentrated solar energy which is initially reflected from the surface of the viewing window. While a horizontally disposed concentrator-collector arrangement is normally preferred, vertically disposed systems may be employed if desired.

It has been predicted that the total electrical power demand for the United States of America in the year 1980 will be approximately $9 \times 10^{12}$ Kilowatt-hours. This power demand is substantially equivalent to that amount of incident solar radiation falling upon an area of only 1,531 square miles of land area located at approximately 33° North Latitude in a given year. Such a latitude is substantially coincident with that passing through the State of Arizona. Assuming an efficiency of conversion of solar energy to electrical energy of only 15 percent, the area required to obtain the projected electrical power demand for the United States of America in the year 1980 is approximately 10,000 square miles, with the area reasonably being expected to provide at least a substantial portion of the projected electrical power demand for the United States of America for the calendar year 1980.

Solar energy is, of course, available for immediate conversion without further depletion or utilization of fossil fuels. The system of the present invention renders it possible to fabricate relatively modest solar energy conversion plants suitable for use in heating and cooling of residential dwellings, as well as commerical establishments with modest to moderate power requirements. This system efficiently and economically converts solar energy to other usable forms of energy at an amortized cost no greater than that cost required for fossil fuel conversion.

Except for the State of Alaska, at those latitudes in which the balance of the United States of America is situated, sunlight is never available on a 24-hour per day basis, and at the same time, each day of the solar year provides a certain reasonable amount of potential sunlight. The sun is, nevertheless, available for exposure to the surface of the ground for a maximum of 50 percent of the total time of a given year within any given location. Depending upon climatic conditions, there will be a reduction from the 50 percent maximum occasioned by cloud cover, as well as a reduction due to the presence of natural or artificial obstacles. However, with the time available for exposure to the sun, it is, nevertheless, economically feasible to employ solar energy as the primary source of energy, with this primary source being supplemented by available fossil fuels. It will be appreciated that the utilization of fossil fuels may be required only during the nighttime hours, or upon the occurrence of periods of heavy and extended cloud cover.

SUMMARY OF THE INVENTION

The concentrator-collector of the present invention preferably employs an array of solar reflectors or panels, grouped together so as to form a solar radiation concentrator means in the form of a line focus Fresnel array, with each of the reflective elements or panels being focused upon the window of a solar collector means. The collector is preferably in the form of one or more elongated elements of generally rectangular cross-section, or of elongated cylindrical elements, with a protective shroud being provided. At least a portion of the shroud is an energy transmissive window to transmit concentrated solar energy from the concentrator to the absorption element or elements, with the window having an outer surface which is generally concave to the concentrator surface to provide for re-entry of reflected radiation and thus a more efficient collection of the concentrated solar energy. In other words, the concave configuration, when arranged in conformance with the aspects of the present invention, provides an efficient re-entrant path for any portion of the incident radiation which may be reflected from the window surface. With the system of the present invention, as in certain others, it is possible to achieve solar power dependency for a given installation in substantial excess of the available sun time by means of utilization of energy storage, such as, for example, the use of heat pumps, thermal storage vessels, thermal energy storage vessels utilizing latent heat of evaporation and condensation of a captive fluid, reversible hydraulic pumping, reversible electrolysis or electrolytic cells, or electrolysis with storage of evolved oxygen and hydrogen. In the electrolysis system, the evolved gases subsequently are combined for burning, thus replacing the fossil fuels which may otherwise be required. At the present time, local weather forecasting techniques are sufficiently sophisticated so as to provide a reasonably accurate prediction for at least a 24-hour period, hence it is reasonably possible to anticipate demand requirements and ultimate availability of solar energy to meet these forecast demand requirements.

Briefly, in accordance with the present invention, a solar heat concentrator-collector is provided which includes an array of reflective panels comprising solar reflective element or concentrator which functions in combination with collector means for receiving the concentrated energy and providing for conversion of the energy into a form which will render it usable. The collector is provided with a concentrator viewing window which has a configuration such that any incident radiation from the collector which is reflected from the surface of the window is reflected along a path which accommodates or permits re-entry of the reflected energy to a second or remote point along the window surface. Also, for thermal insulation considerations, the window is preferably in the form of a double window arrangement with a pair of parallelly disposed panes or panels being arranged in spaced apart relationship, both "panes" of the concentrator viewing window being provided with or forming a concave surface which accommodates re-entry of any reflected radiation.

The concentrator portion preferably comprises a plurality of generally parallelly disposed elongated elements or panels, each having a reflective surface thereon so as to form, for example, a line focus Fresnel reflective array. Means are provided for the purpose of compensating for diurnal changes in solar elevation, thereby adjustably positioning the angular elevational disposition of each of the reflective surfaces into a desired solar viewing disposition relative to the stationary collector. The individual reflective elements are ganged together so as to tiltably compensate for solar elevation changes, with linkage means being provided to effectively gang the surfaces together. Inasmuch as the concentrator array and collector each contemplate a line focus, azimuth compensation is not normally required. Also, means are normally provided for rotatably positioning the individual reflective elements forming the array in inverted inoperative or idle disposition so as to provide a means of protecting the surface from continued exposure to the elements, such as adverse conditions due to hail, blowing dust, and the like.

The axis of the collector means preferably extends generally parallel to the elongated axis of the reflective surfaces. The cylindrical fluid transfer duct of the collector has a closed peripheral surface, with the outer periphery of the collector forming a shroud for the duct and having an energy transmitting zone or window arranged in viewing relationship to the reflective concentrator surfaces, with this window portion of the shroud being disposed at, along or adjacent the focal point of the line focus Fresnel array. That portion of the periphery of the fluid transfer duct which is not in viewing relationship to the reflective elements, or is otherwise remote from the focal point, is normally covered with a thermal barrier for substantially reducing thermal energy losses from the fluid transfer duct, with the shroud forming the outer surface of the collector, and normally defining an annular zone restricting transfer of thermal energy, such as an annular zone filled with a thermally insulative substance. Preferably, the collector means is disposed at a location between the sun and the reflective surfaces, and mounted at an elevation which is vertically above the plane of the reflective elements. In order to concentrate the incident solar radiation, the elongated reflective elements which form the reflective surfaces are preferably formed as arcuate segments defining cylinders or parabolas, although it will be appreciated that flat reflective surfaces may be employed in certain installations as well. The focal length of each of the parabolas will therefore be substantially equal to the distance from the reflective surface to the surface of the absorber means. In order to accommodate the diurnal arcuate elevational movements of the sun, the individual cylindrical reflective parabolas will be arcuately rotated at a rate compensating for these movements or changes in elevation during the daytime hours. Preferably, the individual structures carrying the reflective surfaces are ganged together so as to move the surface as a unit. In other words, in order to compensate for differences in the angular reflection required to focus the reflective surfaces onto the absorber means, the mounting angle of the individual panels will be adjusted to achieve the approximation of a lateral Fresnel lens. Accordingly, the entire array of cylindrical parabolas may be rotated in time with the diurnal movements of the sun in order to maintain the focal point for the incident solar radiation upon the surface of the absorber means.

Also, in order to protect the reflective surfaces from adverse weather conditions such as hail storms, dust storms, and the like, means are provided for rotating the individual reflective surfaces to an inoperative or idle disposition wherein the reflective surfaces are pointed downwardly toward the ground or toward any other supporting surface. In certain instances, it may be desirable to provide for adjustably tilting the elevation angle of the lateral end support columns for the arrays so as to maximize the effectiveness of the reflective surfaces, while minimizing shadowing effects.

Adjustable control of the angular disposition of the individual reflective elements may be accomplished with a single drive motor operating a gang of prearranged reflective elements or panels. Similar techniques may be utilized in order to control the angular disposition of the lateral support elements so as to achieve control of the "shadowing effect" of individual reflective elements, one upon another, however due to the slow rate of change of solar elevation between the seasons of the year, this angular adjustment feature need not be automatically accomplished.

The individual structures forming the reflective surfaces are normally designed to be held in end support columns. Therefore, it is preferable that the individual elements forming the reflective assemblies be freestanding, non-deforming, and accordingly optically stable for greater utility in combination with the absorber means of the present invention. Inasmuch as the individual elements are ganged together, and inasmuch as the elements may be rotated from only one of the two spaced end supports, the individual cylinders or parabolas forming the panels or elements will be functioning as torque-tubes and therefore they should be sufficiently rigid so as to withstand the forces to which they are subjected. The mechanical requirements for the absorber are, of course, consistent with those of the reflectors. The collector must be sufficiently rigid so as to be non-deforming between supports, and must be capable of compliance while withstanding the thermal variations consistent with the design temperatures to which it is being exposed.

Because of the design characteristics and features of the system, it is possible to retro-fit the system to existing structures as well as to apply the system as the primary thermal system in new construction. The capability of protecting the individual reflective elements during extreme weather conditions also provides a safeguard against burn-out of the collector under no-load conditions. In other words, under a situation wherein there is no call for additional energy, the individual reflector elements forming the line focus Fresnel array are de-focused, such as by rotating the panels to turn the reflective surface toward the ground.

By way of location relative to the demand area, it will be appreciated that the concentrator-collector may be used in any location with good sun exposure. Examples of such locations include parking lots, fence lines, roofs of commercial and residental structures, and south-facing walls.

Therefore, it is a primary object of the present invention to provide an improved solar heat concentrator which comprises in combination, a solar radiation concentrator-collector means, the collector being arranged for receiving the solar energy from the concentrator in efficient fashion, providing for at least one re-entrant path for solar energy reaching the collector from the concentrator.

It is a further object of the present invention to provide an improved solar heat concentrator-collector which comprises in combination, a solar radiation concentrator means in the form of a line focus Fresnel array of panels and a collector means for receiving the concentrated solar energy, the collector means preferably including an elongated fluid transfer duct with an axis extending generally parallel to the elongated axis of the reflective array, and with the peripheral surface of the collector defining a shroud having a window portion therein disposed generally concave to the collector elements, and with the absorber means of the collector including a thermal energy absorptive zone and a thermal insulative zone, with the absorptive zone being enclosed by said shroud, and being disposed in viewing relationship to the reflective surfaces of the reflective array and generally within or closely adjacent the focal line thereof.

It is yet a further object of the present invention to provide an improved solar concentrator-collector means which employs a solar radiation concentrator means and a collector means for receiving concentrated solar energy, the solar radiation concentrator means comprising a plurality of generally parallelly disposed elements forming a line focus Fresnel array, each element having a reflective surface with the focal line of each of the reflective surfaces being generally coincident with the surface of the absorber means, and with means being provided to form a shroud about said absorber means, said shroud including a window which provides for the surface of the absorber means to view the concentrator, the window of the shroud being provided with means for effectively capturing substantially all incident concentrated radiation.

It is yet a further object of the present invention to provide an improved solar heat concentrator which comprises a solar radiation concentrator-collector means for receiving concentrated solar energy, wherein the collector means includes an absorber means and a shroud surrounding said absorber means, said shroud including a window element which transmits concentrated solar energy from the concentrator to the absorber means, and further provides for a re-entrant path for any incident concentrated solar energy which may be reflected from the window surfaces.

Other and further objects of the present invention will become apparent to those skilled in the art upon a study of the following specification, appended claims, and accompanying drawings.

DESCRIPTION OF THE PREFERRED EMBODIMENT

Figure 1:
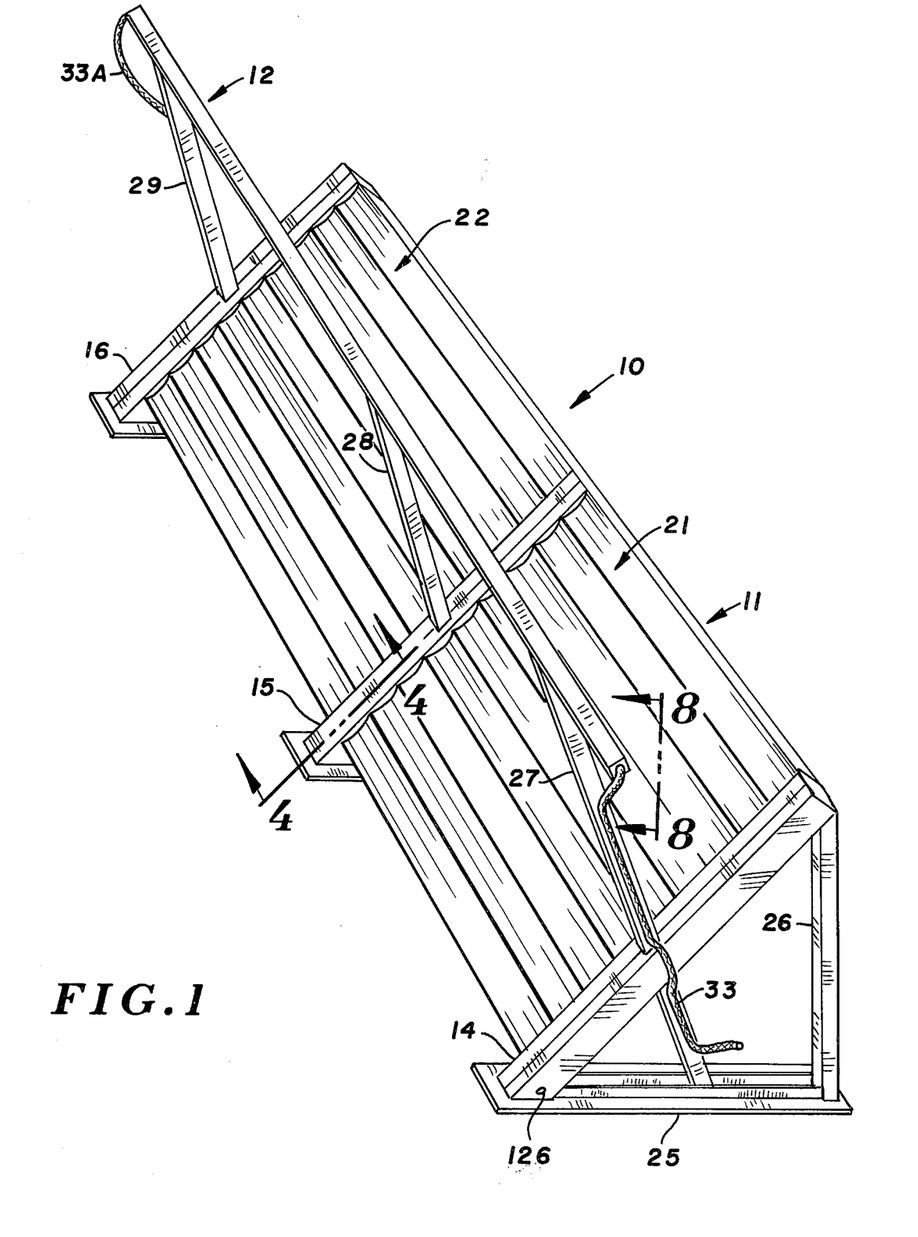
FIG. 1 is a perspective view of a typical installation utilizing the improved collector of the present invention, with the concentrator portion being in the form of a line focus Fresnel array of reflective elements.

In accordance with the preferred embodiment of the present invention, and with particular attention being directed to FIG. 1 of the drawings, the solar heat collector system generally designated 10 comprises, in combination, a solar radiation concentrator means in the form of a line focus Fresnel array generally designated 11, together with a collector means generally designated 12, the collector including an absorber 13 retained within a shroud or enclosure zone. (See FIG. 9). In the concentrator means, a plurality of lateral support columns are provided for the array 11 as at 14, 15, and 16 with the support columns being provided to establish spaced supports for the free-standing non-deforming reflective plate elements such as the elements included in the array 11. As is apparent from FIG. 1, two individual arrays are being employed, these arrays being identified at 21 and 22. Each of the individual slats or cylindrical parabolas incorporated in the system is identical, one to the other, and hence the description of one such element will suffice for a description of all.

Support means are provided for the concentrator means such as a base pad 25 having support posts along each of the columns 14, 15, and 16 as at 26. A bracket means is provided for supporting the collector 12 along each column as well, such as is illustrated at 27, 28, and 29. Base pads 25 also provide support for the individual columns 14-16 inclusive, such as shown. As will be made more apparent hereinafter, a drive motor is provided for the arrays 20 and 21 such as is illustrated at 31 in FIG. 4, with an alternate version being illustrated at 32 in FIG. 5, in each instance, the arrangement being such that one motor drives one or more arrays. Transfer fluid is provided for the absorber element or portion 13 of the collector through a liquid feed line 33, with an outlet or discharge line (33A) being provided at one of the ends, such as at the opposed end of absorber element 13 of the collector 12.

Figure 2:
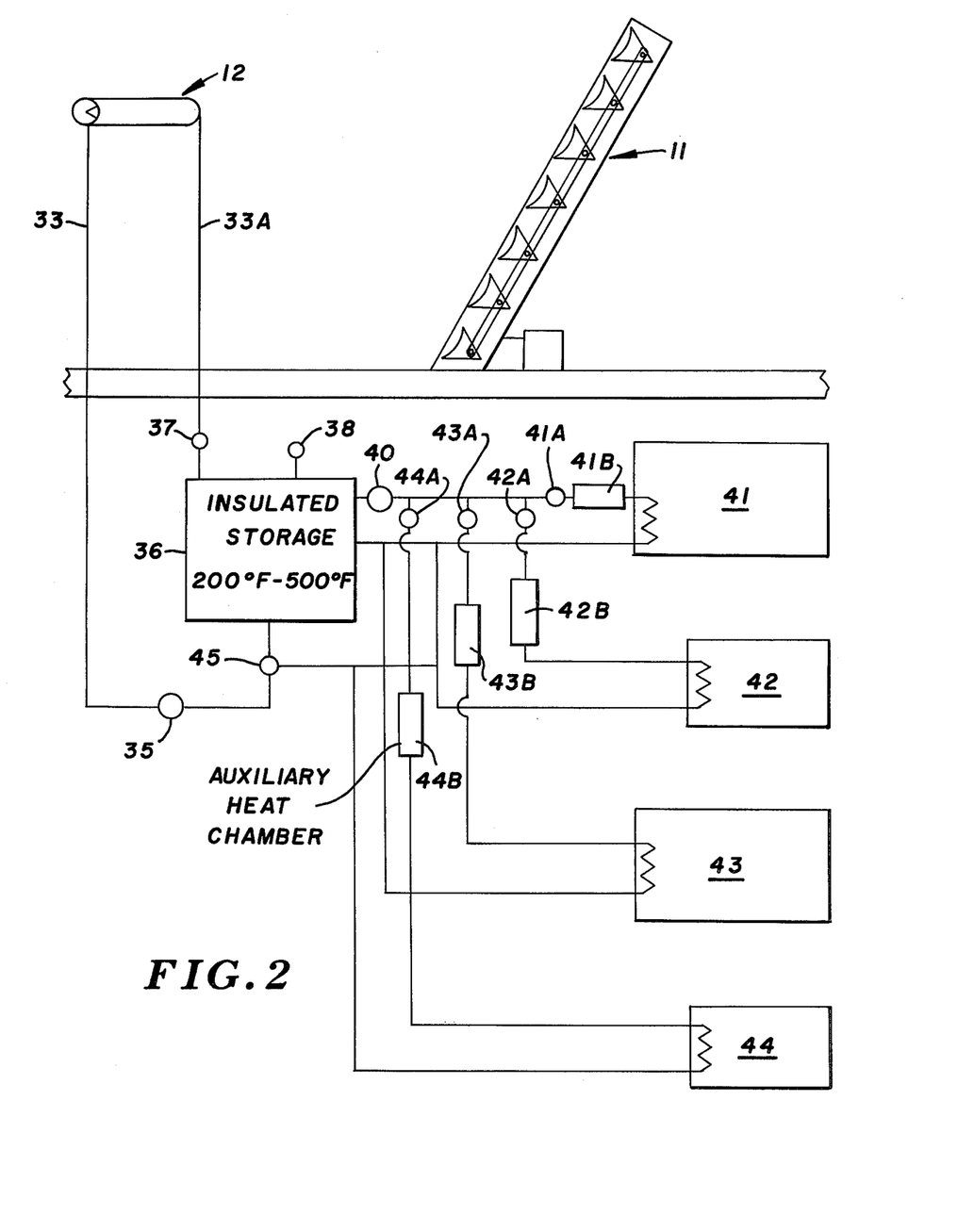
FIG. 2 is a schematic diagram of the system of FIG. 1 and illustrating one typical application to be employed for the structure of FIG. 1.

As has been indicated, the individual reflectors are ganged together so as to achieve a line focus on the collector, and preferably on or along the element or component forming the absorber 13. With attention now being directed to FIG. 2 of the drawings, an example of a system schematic is illustrated wherein a line focus Fresnel array of reflectors in the system 11 is focused upon the collector 12, with an inlet line to the absorber 13 being illustrated at 33 and an outlet or discharge line being illustrated at 33A. The heated fluid passing through the absorber 13 of collector 12 is focused by means of pump 35, with insulated storage vessel 36 being employed to retain the heated fluid for distribution through other zones, as required. Storage vessel 36 is adapted to retain fluid at an elevated temperature, such as from 200° F. to about 500° F. Temperature gauges 37 and 38 monitor the condition of the fluid entering the vessel 36 as well as the material within vessel 36. Pump 40 is used to carry fluid from vessel 36 to any of the working stations or zones such as the heat exchanger for building heat as at 41, a hot water tank as at 42, a heat exchanger for absorbing air conditioning as at 43, as well as a zone for process heating as at 44. Alternatively, a mechanically coupled compressor may be utilized to provide air conditioning and potential heat pumping with mechanical energy being delivered by a Rankine Cycle Prime Mover powered by the stored solar heat. In the illustrated system, individual valves such as 41A, 42A, 43A and 44A control the flow of fluid from pump 40 to each of the individual zones, as illustrated, with three-way valves 45 being employed to direct the return flow either to storage vessel 36 or to pump 35. Thus, it will be seen that the system has application to a variety of processes, and is essentially without limitation in this regard. Also, as has been indicated, it is possible to employ auxiliary heat as at 41B, 42B, 43B and 44B for the individual lines from vessel 36 in order to deliver fluid at a constant elevated temperature.

Figures 3, 6:
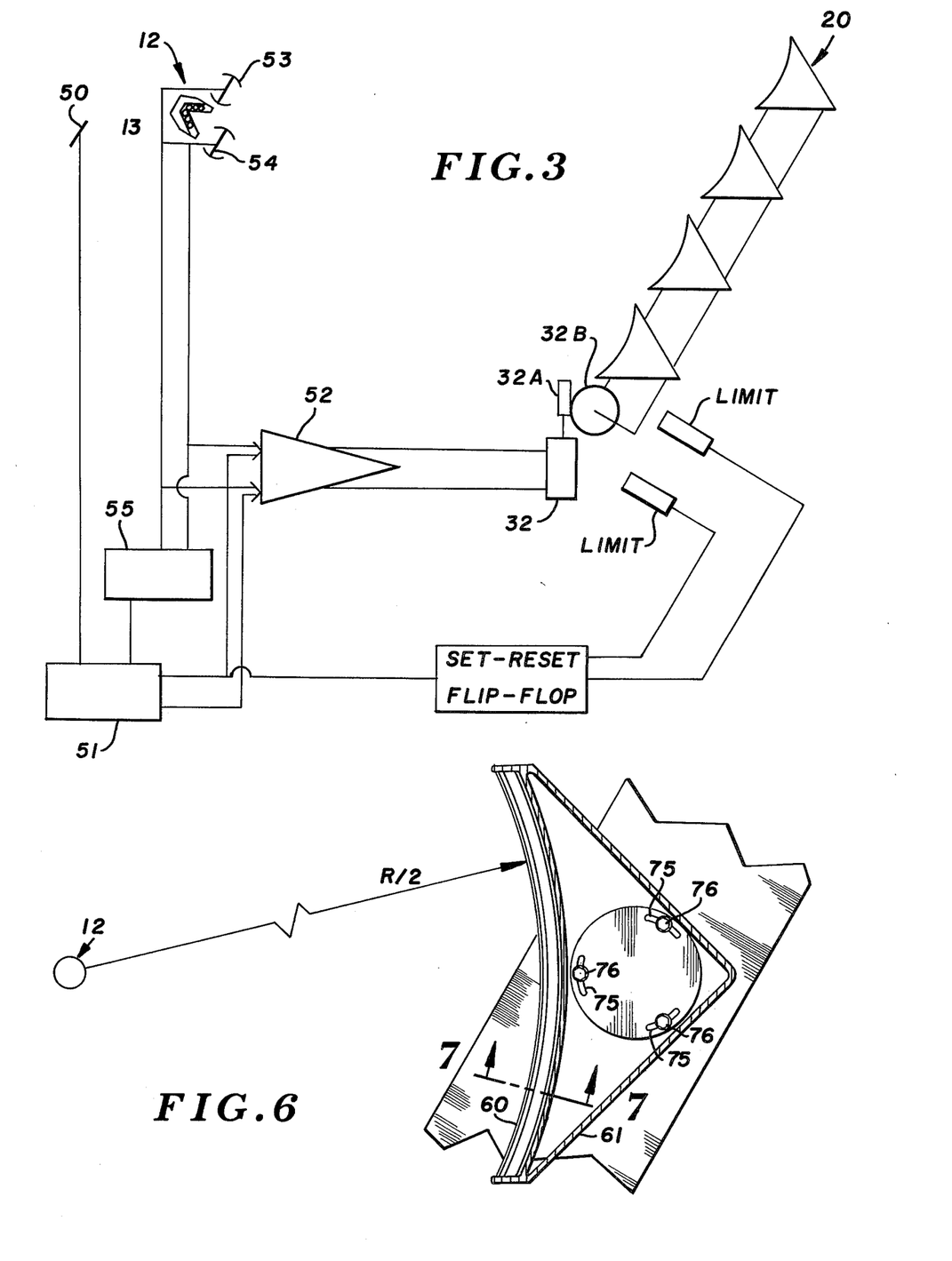
FIG. 3 is a schematic diagram of a drive and tracking system which may be employed in combination with the system of the present invention.
FIG. 6 is a detail side elevational view of a typical reflective panel in the array, and being in the form of a cylindrical parabola, and illustrating the disposition of the panel relative to the absorber means, this figure being shown in fragmentary form.

Attention is now directed to FIG. 3 of the drawings wherein a drive and tracking system for the solar heat concentrator-collector arrangement of the present invention is illustrated.

(A) Totally Unobstructed Sunlight

Upon sufficient light striking sun sensor 50, the No. 1 level discriminator 51 which is, in turn, coupled at its output to differential amplifier 52 drives the differential amplifier 52 and, in turn, drive motor 32. The individual reflective panels as have been described at 20 in FIG. 1 rotate from the "storage" or protective mode as illustrated in FIG. 4A to the active mode as is illustrated in FIG. 3. In order to protect the immediate environment, the drive motor 31 (FIG. 4) may, through its timing belt or other suitable drive belt 31A, rotate pulley 31B so as to position or otherwise individual reflector elements 20 in a counterclockwise direction until focus is achieved on the collector 12. In the embodiment illustrated in FIG. 4A, worm gear drive member 32A and ring gear 32B drive the individual reflector elements 20 in a counterclockwise direction until focus is achieved on the collector 12. Therefore, as shown in FIG. 3, the focused beam from the arrays disposed as in FIGS. 4 and 4B will strike optimizing sensors 53 and 54 at which time the No. 2 level discriminator as shown at 55 overrides the output of sun sensor 50 and causes a signal to differential amplifier 52 which, in turn, is utilized to drive motor 32 and position the sun's image directly on the collector pipe 12. Preferably, the sun sensors 53 and 54 will be disposed in a zone such that direct incident reflected light does not impinge directly on the surface of the sensor. This is due to the high intensities involved. Therefore, these optimizing sensors 53 and 54 will normally be disposed within a housing seeing a modest amount of reflected energy only.

(B) Intermittent Sun Failure

A built-in time delay allows the No. 2 level discriminator 55 to hold the panel members 20 in position. When the time delay, typically in the range of approximately five minutes is exceeded before reappearance of the sun, effective control will revert to the No. 1 level discriminator 51 and the sensor input control reverts from the optimizing sensors 53 and 54 to the sun sensor 50.

(C) Total Sun Obstruction

In the event of total sun failure or obstruction, the sun sensor 50 is delivering no signal to No. 1 level discriminator 51, and this condition will be utilized to deliver a signal to differential amplifier 52 which will return the reflectors 20 to the "storage" disposition or mode as is illustrated in FIG. 6. As is indicated in FIG. 6, the reflective surface is directed downwardly, toward the surface of the ground, thereby enhancing the ability of the system to protect the face surfaces of the reflectors from environmental damage during a storm or during the occurrence of precipitation in the form of rain, snow, sleet or hail.

(D) High Limit Control

The system illustrated in FIG. 3 is adapted to utilization of a high limit control which may be a temperature gauge such as temperature gauge 37 illustrated in the discharge line 33A of collector pipe 12 in FIG. 1, this device acting as a condition sensing element to provide high limit control under modest or no-load conditions. This sensor may be utilized to provide a signal to differential amplifier 52 which will override the sun sensor 50 and return the system to "storage" mode. This arrangement will prevent continued operation and over-heating of the fluid contained in the system.

GENERAL OPERATION

Figure 4:
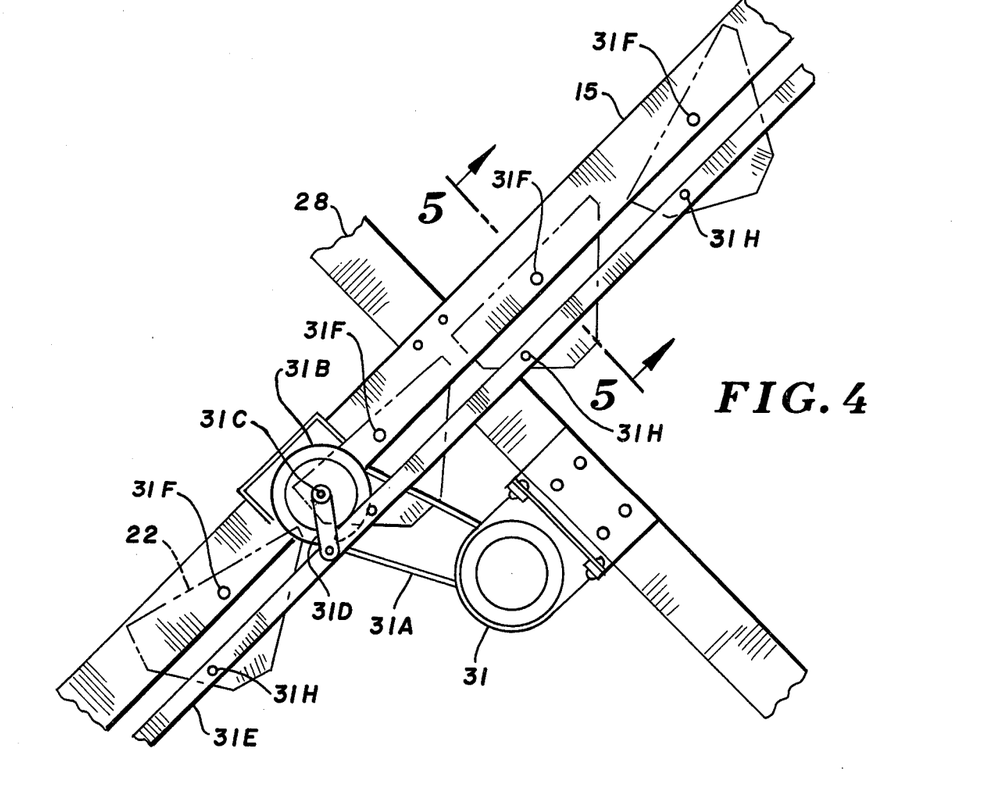
FIG. 4 is a side elevational view on a slightly enlarged scale taken along the line and in the direction of the arrows 4—4 of FIG. 1 and illustrating the details of a typical drive system for the line focus Fresnel array.
Figures 4A, 7:
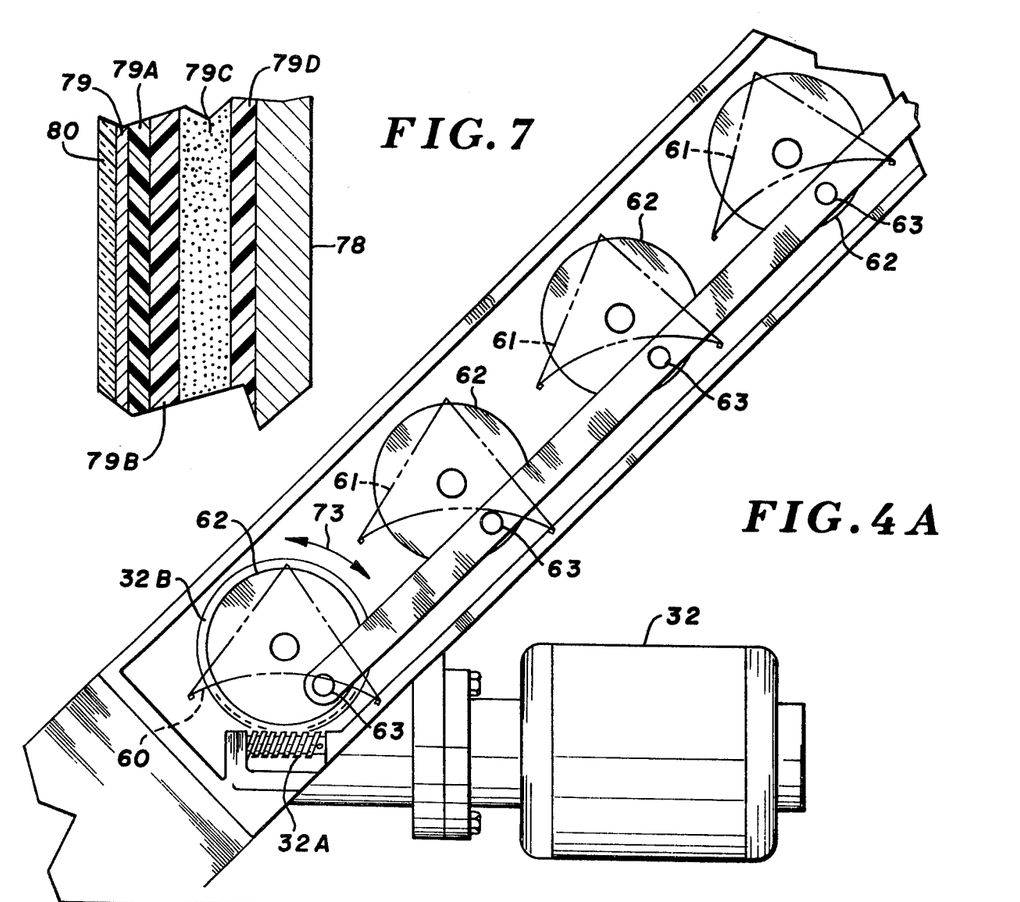
FIG. 4A is a view similar to FIG. 4, but illustrating a slightly modified form of drive system for the line focus Fresnel array.
FIG. 7 is a detail sectional view of a slightly enlarged scale, and taken along the line and in the direction of the arrows 7—7 of FIG. 6.
Figure 4B:
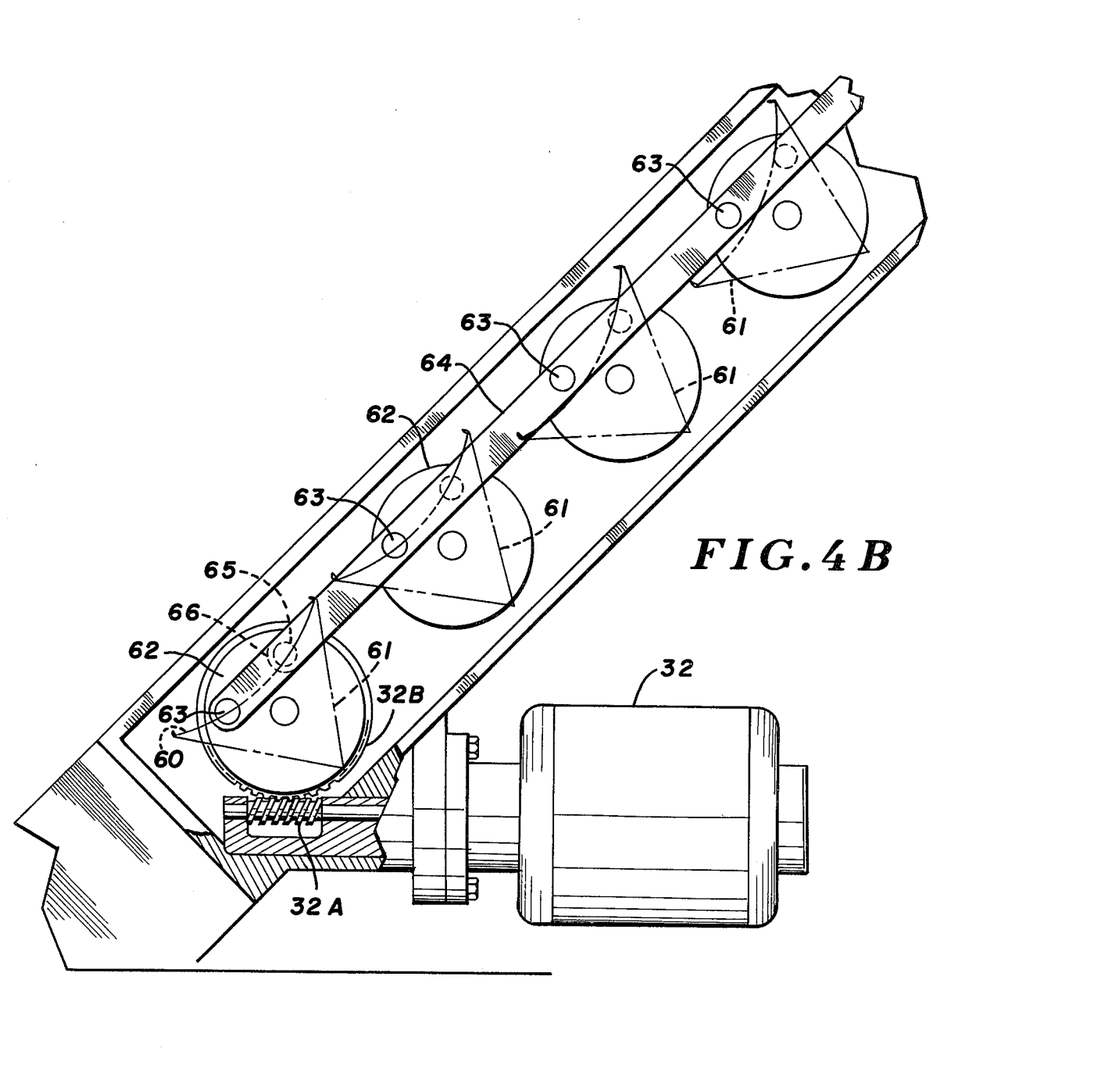
FIG. 4B is a view similar to FIG. 4A, but illustrating the individual members forming the line focus Fresnel array in solar viewing disposition.
Figure 5:
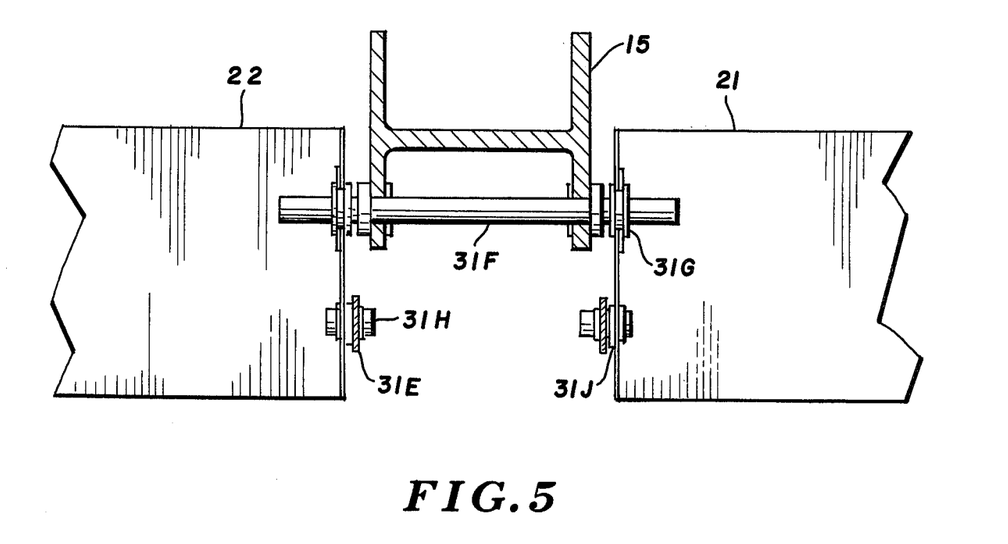
FIG. 5 is a detail sectional view of the drive means illustrated in FIG. 4, and taken along the line and in the direction of the arrows 5—5 of FIG. 4.

Attention is now directed to FIGS. 4, 4A and 4B of the drawings wherein details of one linkage means which may be utilized to move the individual reflector panels in the array is shown. The reversible drive motor, as previously discussed, is illustrated at 31 in FIG. 4 and correspondingly at 32 in FIG. 4A and each is provided with its appropriate drive linkage means. In the embodiment illustrated in FIG. 4, drive motor 31, which is equipped with a speed reducer, utilizes a drive pulley (not shown) upon which drive belt 31A turns. Drive belt is further coupled to driven pulley 31B which, in turn, rotates shaft 31C upon which is secured link 31D. Link 31D is further pivotally coupled to linkage member 31E which, in turn, is pivotally coupled, as illustrated, to each of the individual reflective elements forming the array. In the embodiment illustrated in FIG. 4A, motor 32 has an output shaft upon which is secured worm 32A which, in turn, is in mesh with ring gear 32B on the base member of the array, such as reflective surface 60. Each of the individual reflector panels is stretched tautly across triangular frame arrangement 61, as illustrated in both FIGS. 4A and 6, with the triangular frame 61 being sufficiently durable and rigid so as to provide a torque-tube for the rotation of the individual members of the linear focus array, with the torque-tube functioning in non-deforming fashion. It will be apparent that the elements forming the reflective panels 22 in FIG. 4 are likewise sufficiently durable and rigid so as to provide a torque-tube for the rotation of the individual members of the array. Deformation would, of course, present problems in the ultimate focusing of the individual members on the collector pipe surface.

In order to couple the individual reflectors together in ganged relationship, crank pins are provided on the circular end plates 62—62 of each of the panels shown in FIGS. 4A and 4B, with the end plates carrying eccentric pins 63—63. Linkage arm 64 is, in turn, coupled across each of the individual pins 63 so as to achieve ganged motion of each of the individual reflectors in the array. The operational features of the arrangement illustrated in FIG. 4 will, of course, be the same as that illustrated and described hereinabove with respect to FIGS. 4A and 4B. In the event more than two individual arrays are grouped together, the opposed end of the end column is likewise provided with a similar pin and arm arrangement, with one such eccentric pin being illustrated in phantom at 65. A second arm is then also provided with the pins of the second arm being offset an arcuate distance of 90° from those illustrated in solid lines at 63 and 64 in FIG. 4. The reason for the offsetting is to avoid a condition of dead-centering in the arrangement, thus insuring a positive and full drive during periods of motion for all arrays. In the arrangement illustrated in FIG. 4, the central linkage arrangement is used to adjustably position each of the reflective panels in the arrays as at 21 and 22. Specifically, a pivot shaft is provided as at 31F which is appropriately journaled in bearings as at 31G, with this shaft 31F having secured thereto a link such as link 31D, as illustrated, for coupling to the individual reflectors 21 and 22 through pivot pin linkages such as at 31H. A covering plate is preferably employed to eliminate dust and dirt from the confines of the arrangement. A dust and weather seal in the form of an "O" ring may be used, wherein sealing engagement is made against the surface of cover member and end plate of the reflector panel such as is illustrated at 31J of FIG. 5. It will be noted that the panel 21 and 22 illustrated in FIG. 5 may be any of the individual panels in the array, with the exception of the panel carrying the drive mechanism.

It will be appreciated, of course, that in the event the individual reflective elements forming the concentrator may be moved to the "sheltered" mode in a downward direct rotation, such as in a counter-clockwise direction in the view of FIG. 4. In this arrangement, it is, nevertheless, desirable to employ a structural arrangement which provides effective torque-tube operation during any rotational motion of the individual elements forming the array.

Attention is now directed to FIG. 4A of the drawings wherein the "storage" or "sheltered" mode is illustrated. In this disposition, the individual reflective elements of the assembly have been actuated so as to return to the "storage" disposition. As has been previously indicated, the drive means is provided so as to de-focus the line arrangement by rotating the individual elements in a clockwise direction from the disposition of FIG. 4 to that disposition of the elements illustrated in FIG. 4A. Double-headed arrow 73 is shown for the purpose of illustrating the operational movement between the dispositions of the elements of the components of FIG. 4A.

In order to provide for line focus of the array, on the basis of a Fresnel array, and with attention being directed to FIG. 6, individual arcuate adjustment slots are shown at 75—75 together with mounting screws 76—76 which are employed to provide an initial adjustment of the surface of the reflector panel onto collector 12, as is illustrated. The focal length of panel 60 is, in this instance, equal to the distance "R/2" as is illustrated in FIG. 6. In actual installation operations, therefore, the installer will position each of the individual reflector panels in the array so as to achieve a common focal line for each. In this fashion, the incident solar energy is concentrated from the panel onto a line adjacent the surface of the collector 12 as at focal point in FIG. 9. Preferably, the pivot axis of the reflective surface is in the plane of the surface per se. In this design, therefore, optimum utilization of articulating mechanisms may be achieved.

Attention is now directed to FIG. 7 of the drawings wherein a section of a typical reflector surface is illustrated. As will be appreciated, the structure supporting the reflective surface is one of constant cross-section so as to function as a torque-tube. This structure provides a mounting base for the reflective surface, as well as a protective backing therefor. Inasmuch as the individual reflective elements are supported at their spaced apart ends, the structures must be sufficiently rigid so as to avoid deflection upon those lateral loads occurring due to wind loading and torque loading during adjustment.

In the embodiment illustrated in FIG. 7, a metal backing plate or channel member is illustrated at 78, upon which is applied a metallizing layer of high reflectance such as at 79. A transparent plastic protective coating is provided as at 80 so as to cover the metallized layer 79. In order to achieve optimum reflectivity, metallized layer 79 is preferably either aluminum, or, in some instances, silver. A film of metallizing in excess of approximately 1000 A is normally required to achieve sufficient density of the metallized layers to achieve enhanced reflectivity. For those metals, silver and aluminum, a film thickness of approximately 1000 A is normally sufficient, although when silver is being utilized, a thickness of approximately 800 A is perhaps optimum from the standpoint of reflectance and economy.

It has been learned that the surface configuration of the reflective panels may be substantially planar, cylindrical, or parabolic. Specifically, there may be certain focusing advantages in the utilization of cylindrical structures, however any of the three configurations may be useful. When curved reflective surfaces are employed, for sharper imaging the various radii of the mirrors will be selected so that the center mirror will possess the shorter focal length, with the focal length increasing slightly from the center mirror to the edge mirrors. In this fashion, the off-axis focal length of the various mirrors will be substantially the same, it being normally anticipated that the center mirror will reflect incident radiation substantially normal to the center of the reflective element.

In preparing a typical reflector member, a mold surface is provided having a convex surface for receiving the sandwich of components making up the reflective surface. The initial layer to be applied to the surface will be a film of stress-oriented polyethylene terephthalate (Mylar) having a thickness of one-half mil, and being coated with aluminum, the aluminum having a thickness of at least about 1000 A. A layer of fiberglass is then applied to the stress-oriented polyethylene terephthalate surface, and bonded thereto. Thereafter, a foam backing having a thickness of approximately one inch is applied to the fiberglass layer, in order to increase the modulus of the overall structure. The foam material is a structural foam such as polystyrene or polyurethane having a density of approximately 2 pounds per cubic foot. The back surface of the foam member is thereafter covered with a layer of fiberglass impregnated with a resin such as epoxy resin or the like. Each of the two layers of fiberglass is preferably impregnated with a durable resin such as epoxy or polyester, with such resins being, of course, commercially available. A protective coating is supplied to the metallized layer, with the protective coating preferably being an acrylic top coat in the form of a lacquer. A polymer film may be sucessfully utilized for this purpose, however. The transparent plastic coating 80 which functions as a protective coating for the metal is preferably acrylic or, although in certain instances, FEP Teflon may be utilized. A film, if utilized, may be between about 0.25 mil up to about 1 mil with either being appropriate. Typically, an outer film or protective coating 80 is utilized, such as an acrylic coating, which encloses aluminum layer 79 which is prepared as an aluminized coating of stress-oriented polyethylene terephthalate, such as at 79A. Such aluminized film in the form of aluminized Mylar is available from the E. I. du Pont de Numours & Company of Wilmington, Del. A layer of epoxy fiberglass, cured to a rigid layer is shown at 79B with the polystyrene foam layer being shown at 79C. A second layer of epoxy fiberglass is shown at 79D, with the entire structure being securely bonded to the surface of backing plate 78.

Figure 16:
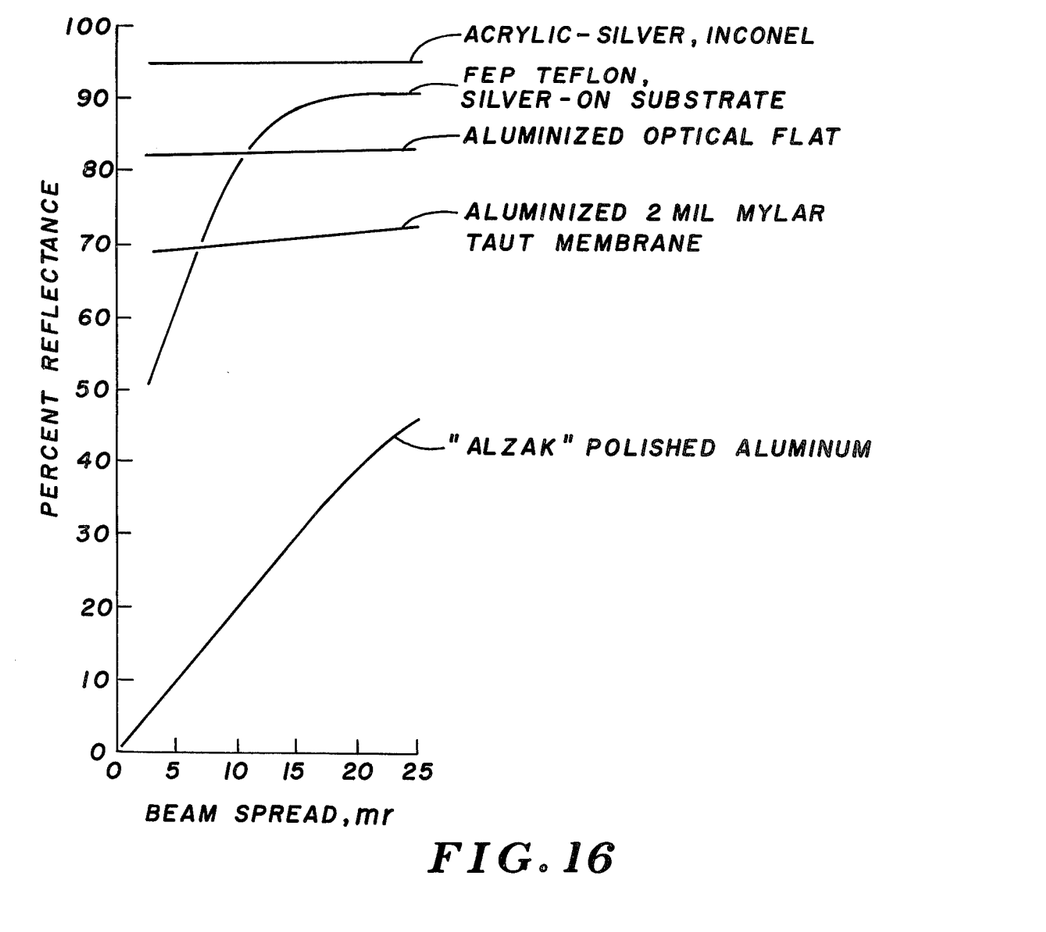
FIG. 16 is a plot of the measure of specular reflectivity of various laminate materials useful in the fabrication of the reflective panels employed in the present invention, plotting percent reflectance vs. milli-radians of beam spread in the relevant range of requirements for the line focus Fresnel collector array.

At FIG. 16, the characteristics of specularity of various reflective materials illustrated. The milliradians of beam spread for a typical collector should reasonably be held between about 3 and 24 under any typical operating condition. The measure of specularity of various combinations of reflector materials is provided at FIG. 16, with the family of curves being indentified in the legend. As is apparent, silver provides a higher degree of reflectance than does aluminum, however the cost consideration may dictate that aluminum be employed in preference to silver.

One definite requirement of the material selected for the reflective surface is that it be optically stable. The combinations of materials provided herein do achieve sufficiently stable optical characteristics so as to render them sufficiently stable for these purposes.

Figure 8:
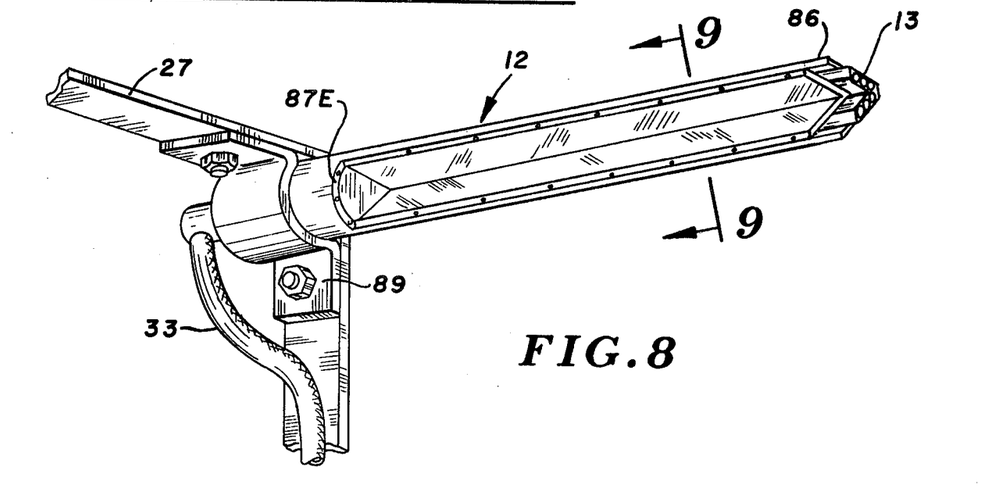
FIG. 8 is a fragmentary view of an end portion of the collector means illustrated in FIG. 1, with this view being taken along the line and in the direction of the arrows 8—8 of FIG. 1.
Figure 9:
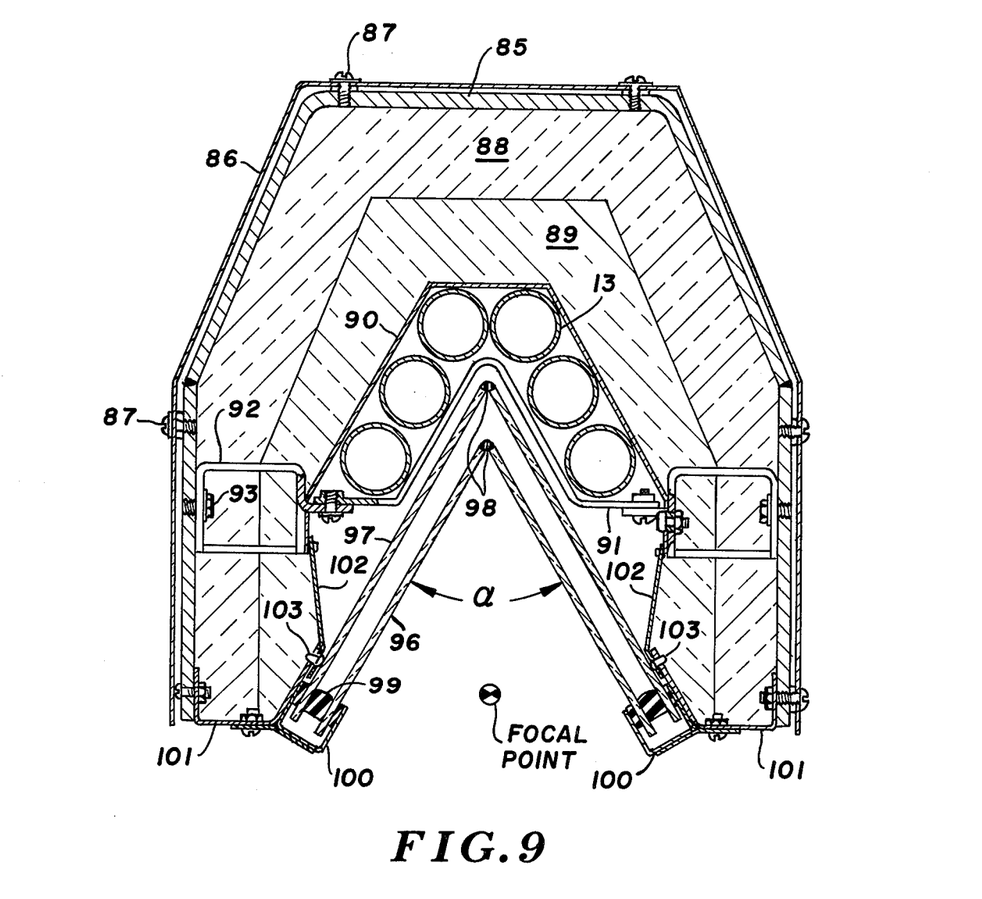
FIG. 9 is an enlarged vertical sectional view of the collector means illustrated in FIG. 8, and is taken along the line and in the direction of the arrows 9—9 of FIG. 8.
Figure 10:
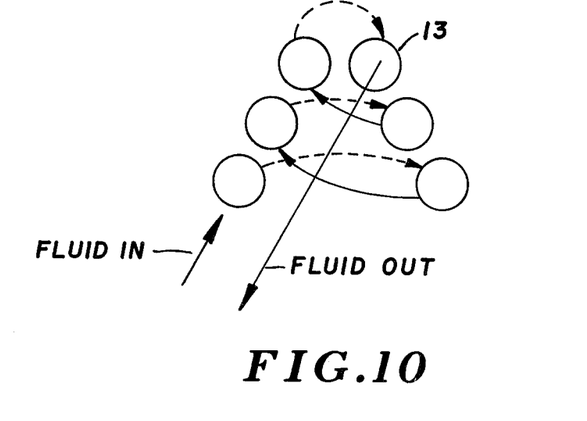
FIG. 10 is a sectional view of the absorber column shown in FIG. 9, and illustrating schematically the typical flow arrangement through the system.

Attention is now directed to the illustrations in FIGS. 8—10 inclusive wherein details of the preferred collector means are illustrated. Turning initially to FIGS. 9 and 10, it will be observed that the absorber 13 of the system is a cluster of pipes, particularly pipes such as carbon steel boiler tubing having a high temperature capability, with the outer periphery of the tubing having been blackened as is normal in these structures so as to render the pipe absorbent. Absorber 13 is, of course, capable of transmitting fluid under the operating conditions herein, with the flow pattern being illustrated in FIG. 10. The shroud 85 surrounds absorber 13, as illustrated in FIG. 9, with an external cold-rolled steel sheet member or external shroud 86 being provided for reducing thermal losses through radiation. Other shroud 86 is secured to main shroud 85 by means of screws as at 87—87. The inner volume of the concave shroud 85 is filled with insulation such as at 88 and 89, with the layers being separated by a layer of aluminum foil, as indicated (it being understood that an aluminized high temperature film such as polyimide film may be utilized in lieu of aluminum foil), with pipe cluster collector 13 being, therefore, suitably backed by a firm insulation barrier. A stainless steel sheet inner shell is provided at 90, thus enhancing the collection and conservation of thermal energy within the absorber zone. Spaced mounting bracket 91 is provided for permitting thermal expansion and contraction of the pipe cluster forming absorber 13. Members 90 and 91 are, in turn, secured by hanger brackets and screws 92 and 93 respectively to the basic shroud member 85. Two parallel panes of glass are provided as at 96 and 97, with these panels being in a "V" form and secured as at 98 by silicone rubber or the like. Panes 96 and 97 are preferably 0.060 inch Pyrex, it being understood that other suitable high temperature borosilicate glasses may be employed. A silicone rubber pad is further provided as at 99 for the individual glass panes. The silicone pads are preferably RTV silicone bedding seals or beads. Stainless steel sheet metal cradles 100—100 are used to support the "V" members 96 and 97, with cradles 100—100 being, in turn, secured to shroud 85 by means of brackets 101—101. In order to retain insulation layers 88 and 89 properly in place, a stand-off support is illustrated at 102—102 to fulfill this purpose. In order to again reduce convective and conductive losses, coupling means are provided at 103—103 to reduce or eliminate or increase the resistance of the thermally conductive path between member 102 and 85. Preferably, the inner surface of shroud 85 is polished so as to direct any stray incident radiation in a direction wherein it may become again re-reflected onto the surface of absorber 13, although such polishing is not absolutely required.

In order to provide a viewing surface toward the concentrator, the double pane windows 96 and 97 are provided, with the windows having a configuration concave to the concentrator sources as to provide a re-entrant path for any of the concentrated energy which may be reflected from the surface of the window element as previously described. The "V" re-entrant path or structure may be used with any primary concentrator which, when viewed from the focal line has a subtended angle of less than 60°, with decreasing effectiveness for angles greater than 60°. Rim angles are also of consideration since these do contribute to losses. The array of individual reflectors in the Fresnel array has a subtended angle of 60° in this embodiment. The "V" re-entrant arrangement need not be re-adjusted for sun angles of incidence, since the focal point or aim point for the various sun angles will always remain the same. With this arrangement, typical losses are found to be less than about 2 percent of the total solar input, thus resulting in considerable savings in solar input energy. The 2 percent loss is substantially superior to that of a conventional double-glazed system. Typically, the conventional double-glazed system receiving radiant energy at or near normal incidence loses approximately 4 percent of the incident radiation per surface, or a loss exceeding 12 percent in total. The "V" re-entrant system is substantially more efficient, losing only about 2 percent of the incident radiation upon passing through the four surfaces from the double-glazed system.

The windows 96 and 97 are spaced apart so as to define a gap or zone therebetween. The gap or zone may be evacuated, if desired, in order to reduce the conductive losses therethrough. The individual windows 96 and 97 are each formed in two segments or elements, with these two segments or elements meeting or intersecting at an apex, the included angle Alpha being preferably, as indicated, 60° with angles of between 40° and 60° being useful. A proper re-entrant path is provided for all incident radiation when the included angle Alpha is less than 60°, but for purposes of reducing the surface area requirements of the window, the angle of 60° is preferred. For alternate considerations, however, it may be desirable to reduce this included angle to approximately 40°. Included angles of less than 40° have been found to provide surface areas which are unreasonably large, and furthermore such a reduced included angle does not effectively increase the re-entrant probability.

The opening available across the window 96 will normally be equal to or slightly greater than the line focus at that point.

In addition to the utilization of planar surfaces to form the re-entrant window, a surface having a parabolic configuration may be utilized. Such a parabolic surface is designed so as to provide for re-entrant capability, and hence must enclose at least about 60° of arc in order to be effective, and with the open ends of the parabola including surfaces diverging at an angle no greater than about 60°.

The windows 96 and 97 are fabricated from a suitable radiation transmissive glass, such as Pyrex Glass No. 7740, available from Corning Glass Works of Corning, N.Y. Pyrex Glass 7740 is a borosilicate glass readily available in plate or sheet form. Such materials are structurally sound and capable of withstanding those temperatures to which the system is exposed. In addition to the use of this material in planar or sheet form, a parabolic form may be utilized wherein the open ends of the parabola include surfaces diverging at an angle no greater than about 60°.

In a typical installation of 20-foot length, a window in the form of a "V" may be utilized having each leg of the "V" structure about six inches in length, and with a thickness of ¼ inches. The window, which includes two partially disposed "V" shaped panels will normally be constructed of materials of similar or like dimension.

In the event it is desired to reduce the reflectivity of the surface, a suitable non-reflective coating may be applied. Normally, however, suitable results may be obtained without applying any special coating to the surface of the window.

Insulation barriers 88 and 89 will preferably be fiberglass mat, and thus provide for a thermal protection of the shroud 85 from the intense heat available at the focal point. With regard to the focal point, the fluid flow as illustrated in FIG. 10 is such as to take reasonable advantage of the disposition of the focal point relative to the individual lines. In this connection, however, the greater intensity of heat is normally available at the point generally adjacent the spans or runs closest to the apex, thus the temperature differential is provided in the proper direction.

Figures 11, 12, 13:
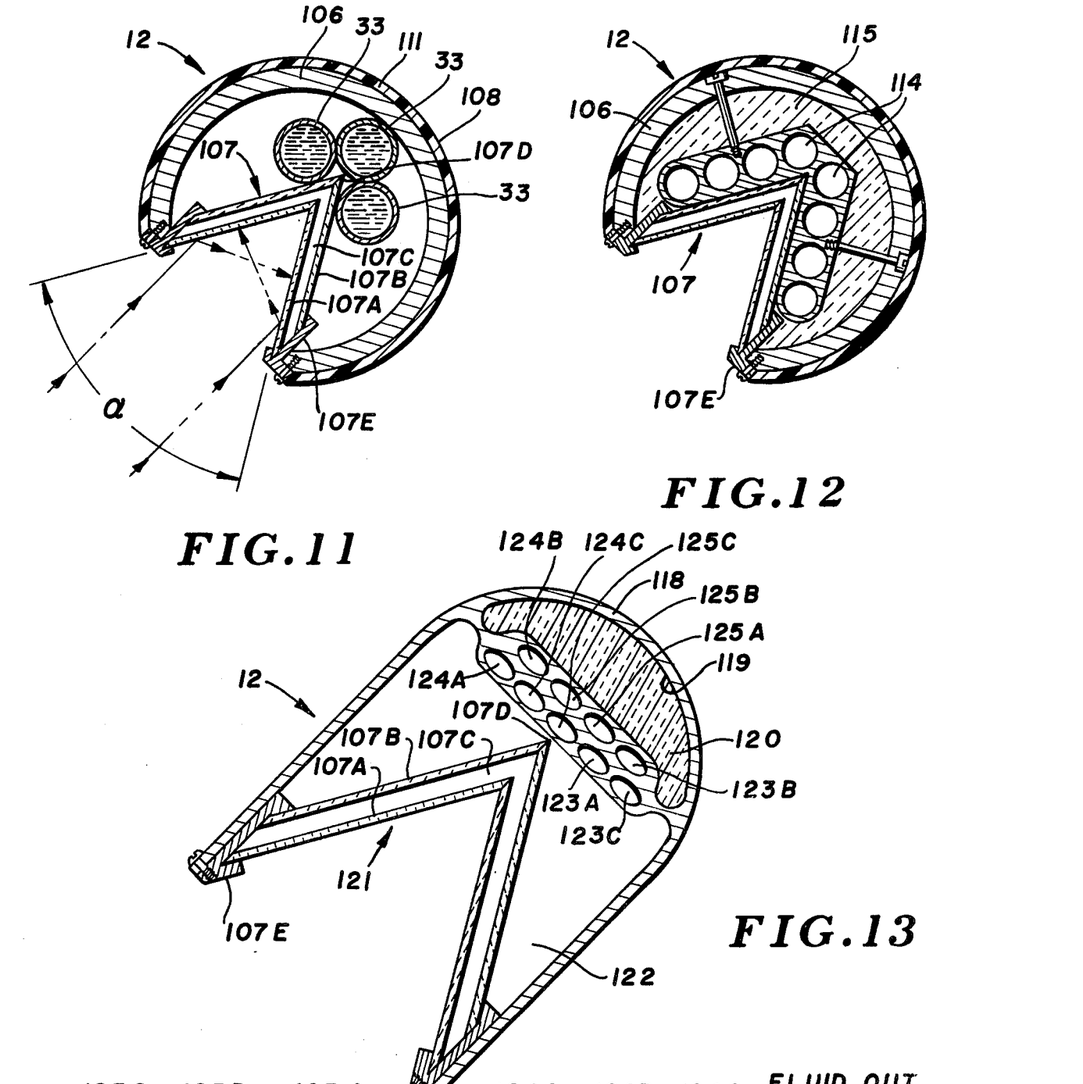
FIG. 11 is a view similar to FIG. 9, and illustrating a modified form of collector means utilizing an absorber comprising a plurality of axially parallelly disposed fluid transfer ducts.
FIG. 12 is a view similar to FIGS. 9 and 11, and illustrating still another modified form of absorber means which may be employed in the collector means of the present invention.
FIG. 13 is a view similar to FIGS. 9, 11 and 12, and illustrating a further modified form of absorber means which may be employed in the collector means of the present invention.

Attention is now directed to FIG. 11 of the drawings wherein a modified system is illustrated, and wherein thermal barrier layer 111 is provided externally of split aluminum tubing 106. The details of the window element 107 and its re-entrant reflective capability is also illustrated in FIG. 11. Layer 111 which is preferably fiberous glass mat provides additional thermal protection for aluninum tubing 106 and further provides a means for isolating wire wrap 108 from direct conductive contact with tubing 106. As is indicated in FIG. 11, the fluid being transmitted within the tubing forming the absorber portion of collector 12 is illustrated in the interior of the pipe.

Attention is now directed to FIG. 12 of the drawings wherein a still further modification of the collector system 12 is shown. In this structure, a plurality of individual runs or flow channels are provided as an absorber, such as in the nest of copper pipes illustrated, the individual pipes being identified at 114—114. The surfaces of each of the pipes 114—114 are blackened so as to enhance the absorbing characteristics. In this arrangement, an insulating backing is provided as at 115 in order to isolate thermally the zone immediately adjacent the rear surface of pipes 114—114 from that of the inner surface of split aluminum tubing 106. In this embodiment, tubing 106 is, of course, common to the system illustrated in FIGS. 11 and 12, as is window 107. The advantages of utilizing parallelly disposed channels or pipes is to broaden the focal zone for the collector, and thus reduce the degree of precision to which focal line positioning must be available.

For example, in the event it is desired that flat reflective surfaces be employed in the concentrator, a widened channel or group of channels should normally be provided in the absorber element. Therefore, either a rectangular channel or nest of parallelly disposed pipes, for example, may be employed.

Attention is directed to FIG. 13 wherein still a further modification of a collector device is illustrated. In this arrangement, the structure includes an outer aluminum shell 118 which carries a first core as at 119 for receiving an insulation barrier 120 therewithin. A glass panel is provided as generally indicated at 121 in order to reduce the flow of convective currents in the zone 122 which extends between the surface of individual inlet conduits such as 123A, 123B, and 123C from ambient. It will again be appreciated, of course, that a flow channel or flow diagram arrangement may be prepared consistent with the flow diagram of FIG. 14, with a certain arrangement of interconnections at the terminal ends of the individual channels 123A, 123B, and 123C, and 124A, 124B, and 124C.

Figure 14:
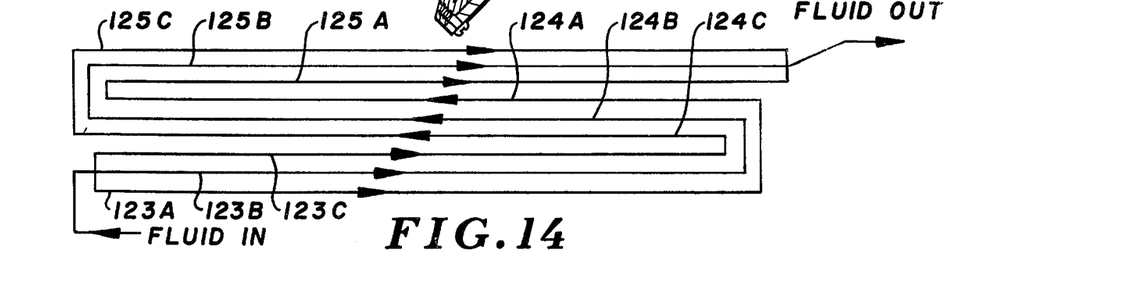
FIG. 14 is a typical flow diagram which may be employed in the arrangement illustrated in FIG. 13.

It will be appreciated that any of a variety of flow patterns may be utilized. For example, a flow diagram for the structure illustrated in FIG. 12 is illustrated in FIG. 14, it being appreciated that flow is obtained through the plurality of channels in order to enhance the overall characteristics of the system.

As a further alternate to the type of collector system being utilized, a rectifying heat pipe may be employed which utilizes a pair of diverging fins having a heat pipe disposed at the apex thereof. The fins may each be in the form of enclosures, with the enclosures being vacuum-tight, and filled with a fluid capable of wetting the individual surfaces. The incoming thermal energy or radiation causes the fluid to change state from liquid to gas, and, in turn, condenses upon the heat pipe disposed at the apex. The heat pipe, in certain instances, may be in the form of an annulus with the rectifying fluid being enclosed within the outer pipe, and with the heat transfer fluid being within the inner pipe, the pipes being, of course, preferably disposed in coaxial relationship.

Figure 15:
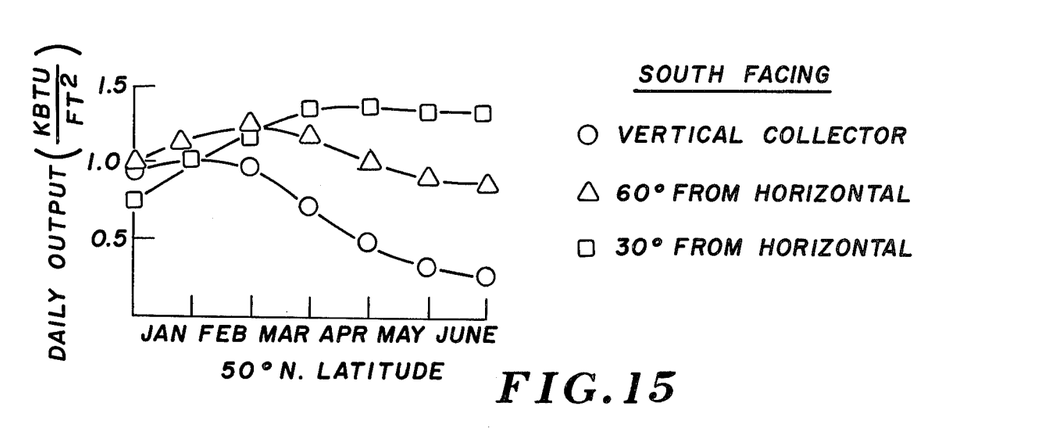
FIG. 15 is a graph illustrating a family of curves plotting daily output in BTU's vs. months of the calendar year at 40° North Latitude, with each member of the family of curves illustrating a different degree of inclination from the horizontal for the lateral supports of the line focus Fresnel array of reflectors, of the type illustrated in FIG. 1.

As has been previously indicated, the angular inclination of the individual arrays is relevant to the functioning of the system. The plot illustrated in FIG. 15 shows the daily BTU output for the months of January through June for three families of column dispositions, the column dispositions being arranged vertically, 60° from horizontal, or 30° from horizontal. During the months of January and February, a disposition of 60° from horizontal is preferable from the standpoint of BTU output, while for the months of March through June, the inclination of 30° from horizontal appears to provide the greater BTU output. Obviously, the months of July through December will be the converse of January through June because of the reverse cycle of the sun occurring during that period of the solar year. In order to take advantage of these features, a pivotal mounting means may be provided for the individual columns 14, 15 and 16, such as in the form of pivot pins such as the pivot pins 126—126 which couple the individual supports 14–16 inclusive to the base pad 25. An adjustable means may be provided in support post 26 in order to achieve either permanent or temporary positioning of these members.

In a typical installation wherein the peak loading occurs during the winter months, it will be desirable, of course, to use an angular inclination which provides the greatest effectiveness during the winter months. If summer loading is modest, it may not be necessary to change the angular inclination, however this may be done in the event of heavy loading both during the summer and winter due to heating and air conditioning requirements.

While the value of the focal length of each of the individual reflective elements in the array may be substantially equal, this value may be selectively variable, from one reflective panel to the next in the event the disposition of the individual reflective panels in the array is such that a significant difference exists in the distance from the reflective surface to the collector surface. It will be further appreciated, of course, that with a focal length of approximately 10 feet, for example, a modest de-focusing will not significantly alter the effectiveness of the system inasmuch as the effective width of the absorbing surface may be large when compared to the absolute value of the line focus contemplated and utilized.

I claim:

1. In a solar heat concentrator and collector comprising, in combination, solar radiation concentrator means and radiation collector means including a shroud enclosing an absorber means therewithin, and a window means within said shroud for transmitting concentrated solar energy from said concentrator means to said absorber means;

(a) said solar concentrator means comprising lateral support columns and means for controllably positioning a plurality of elongated reflective surfaces mounted on said lateral support columns in solar viewing and absorber reflecting disposition;

(b) said absorber means including an elongated fluid transfer duct disposed within said shroud and having a cylindrical axis extending generally parallel to the elongated axis of each of said plurality of reflective surfaces;

(c) said shroud defining a generally closed loop with a radiation transmissive window therealong, said window comprising a radiation permeable member having an outer surface concave to said concentrator means and defining a transmissive path for a substantial portion of the radiation received by said collector means from said concentrator means, and defining a re-entrant path for radiation which is reflected from said outer concave surface, said re-entrant path extending from a first point along said outer concave surface to a second point along said outer concave surface remote from said first point.

2. The solar heat concentrator and collector as defined in claim 1 being particularly characterized in that said window comprises a pair of spaced apart generally "V" shaped members of relatively thin cross-section, with the angle of the apex of said "V" shaped members being between about 40° and 60°.

3. The solar heat concentrator and collector as defined in claim 2 being particularly characterized in that said angle is approximately 60°.

4. The solar heat concentrator and collector as defined in claim 1 being particularly characterized in that said means for controllably positioning said reflective surfaces includes means for rotation of each of said elongated reflective surfaces about an axis disposed generally parallel to the elongated axis of said reflector surface.

5. The solar heat concentrator and collector as defined in claim 1 wherein means are provided for controllably tilting said lateral support columns to accommodate seasonal variations in solar elevation.

6. The solar heat concentrator and collector as defined in claim 1 being particularly characterized in that said concentrator comprises a plurality of elongated reflective surfaces, each having a focal line converging upon and substantially coincident with the plane of said absorber.

7. The solar heat concentrator and collector as defined in claim 1 wherein said absorber is coated with a black film.

8. The solar heat concentrator and collector as defined in claim 1 being particularly characterized in that said window is fabricated from borosilicate glass.

9. The solar heat concentrator and collector as defined in claim 1 wherein said fluid transfer duct is fabricated from copper.

10. The solar heat concentrator and collector as defined in claim 1 wherein said radiation absorber means comprises a plurality of generally parallelly disposed fluid transfer ducts.

11. The solar heat concentrator and collector as defined in claim 1 wherein said radiation absorber means is disposed between the sun and said reflective surfaces.

12. The solar heat concentrator and collector as defined in claim 1 wherein coupling linkage meas are provided between adjacent reflective surfaces.

13. The solar heat concentrator and collector as defined in claim 1 including solar detector means for detecting incident solar radiation.

14. The solar heat concentrator and collector as defined in claim 1 wherein solar radiation responsive means are provided for controllably adjusting the arcuate disposition of each of said reflective surfaces in response to diurnal changes in solar elevation.

15. The solar heat concentrator and collector as defined in claim 14 wherein said solar radiation responsive means are positioned in oppositely disposed relationship of the axis of said absorber means.

16. The solar heat concentrator and collector as defined in claim 1 being particularly characterized in that said collector comprises a plurality of generally parallelly disposed elongated reflector elements, with each element having a reflective surface.

17. The solar heat concentrator and collector as defined in claim 16 being particularly characterized in that said elongated reflective surfaces are line focus cylinders, each having a focal line converging upon and being substantially coincident with the plane of said absorber.

* * * * *

UNITED STATES PATENT AND TRADEMARK OFFICE
CERTIFICATE OF CORRECTION

PATENT NO. : 4,088,120

DATED : May 9, 1978

INVENTOR(S) : Donald E. Anderson

It is certified that error appears in the above—identified patent and that said Letters Patent are hereby corrected as shown below:

Column 8, lines 32-33, "focused" should read -- forced --.

Column 13, line 17, "Other" should read -- Outer --.
Line 59, "sources" should read -- source so --.

Signed and Sealed this

Twelfth Day of September 1978

[SEAL]

Attest:

RUTH C. MASON
Attesting Officer

DONALD W. BANNER
Commissioner of Patents and Trademarks